United States Patent [19]

Abramitis

[11] 3,900,307

[45] Aug. 19, 1975

[54] COMPOSITION AND METHOD FOR CONTROLLING SUCKERS IN TOBACCO

[75] Inventor: Walter W. Abramitis, Downers Grove, Ill.

[73] Assignee: Akzona Incorporated, Asheville, N.C.

[22] Filed: Apr. 5, 1973

[21] Appl. No.: 348,393

[52] U.S. Cl. .......................... 71/78; 71/76; 71/106; 71/122
[51] Int. Cl. .............................................. A01n 9/24
[58] Field of Search....................... 71/78, 106, 122

[56] References Cited
UNITED STATES PATENTS

| | | | |
|---|---|---|---|
| 3,620,712 | 11/1971 | Conklin | 71/78 |
| 3,697,250 | 10/1972 | Young et al. | 71/78 |
| 3,713,804 | 1/1973 | Moccia | 71/78 |
| 3,810,750 | 5/1974 | Davidson et al. | 71/78 |

OTHER PUBLICATIONS

Chemical Abstracts, Vol. 61, Col. 1753(d), 1964.
Chemical Abstracts, Vol. 60, Col. 14379, 1964.

*Primary Examiner*—James O. Thomas, Jr.
*Attorney, Agent, or Firm*—Francis W. Young; Philip M. Pippenger

[57] ABSTRACT

The control of undesirable secondary growth in plants is accomplished by applying thereto a composition having as essential reactive components: (1) a carboxylic acid diester of an aliphatic glycol wherein the carboxylic acid residue contains from 7 to 15 carbon atoms and the glycol residue is derived from an aliphatic glycol selected from the group consisting of alkylene glycols containing from 2 to 6 carbon atoms and di- and trialkylene glycols of the ethylene series; (2) a surface active agent; and, (3) an aliphatic alcohol having from 8 to 12 carbon atoms.

20 Claims, No Drawings

COMPOSITION AND METHOD FOR CONTROLLING SUCKERS IN TOBACCO

BACKGROUND OF THE INVENTION

The prior art describes the use of various types of esters in control of plant growth in various ways. U.S. Pat. No. 2,850,526 describes the use of 3-(haloaryloxy)-1,2-propanediol esters of polychloro lower aliphatic monocarboxylic acids for controlling weeds and for the sterilization of soil. U.S. Pat. No. 2,734,076 also relates to halogenated esters and describes partial esters of aliphatic polyhydric alcohol, such as ethylene glycol, with an $\alpha, \alpha$-dichloropropionic acid as being useful for plant growth materials. In U.S. Pat. Nos. 3,326,664 and 3,340,040 is described the use of lower alkyl esters of $C_6$ to $C_{18}$ fatty acids for inhibiting the growth of tobacco suckers. Gower et al. (U.S. Pat. No. 3,556,763) describe the use of alkoxy polyalkylene glycol-esterified polymers of styrene and maleic acid as surface active agents in aqueous emulsions for horticultural chemicals such as plant growth regulants. At Column 3 of Gower et al., in describing suitable desuckering agents, mention is made of lower-alkyl esters and alkanols containing 6 to 20 carbon atoms.

In various plants, such as, for example, tobacco, tomato, cotton, soybean plants, etc., undesirable secondary growth, which is generally referred to as "suckers", creates a serious problem because the suckers develop rapidly to shade desired portions of the plant, compete for nutrients, and tend to ruin the quality of such desired portions. In the tobacco plant, secondary buds form at the points where the leaf stems join the plant, and later after the flower is removed, grow rapidly to form sucker growths extending over the leaves. The sucker growths can be removed manually, but this is a laborious and expensive proceeding. The use of sucker oil and chemicals, while effective in control of such secondary growth, nevertheless have in the past had serious disadvantages. The sucker oil tends to form leaf and stalk damage, causing soft spots that are attacked by microbes, and also there is a lack of control of the lower sucker stalks. Some chemicals which have previously been used also produce cellular changes in the leaf, tending to reduce the filling capacity of the treated tobacco for cigarette manufacture. Further, the cost of the chemicals has been high.

DESCRIPTION OF THE INVENTION

The composition of the invention, which is applied to plants to avoid the above disadvantage has, as essential reactive components: (1) a carboxylic acid diester of an aliphatic glycol wherein the carboxylic acid residue contains from 7 to 15 carbon atoms and the glycol residue is derived from an aliphatic glycol selected from the group consisting of alkylene glycols containing from 2 to 6 carbon atoms and di- and trialkylene glycols of the ethylene series; (2) a surface active agent; and (3) an aliphatic alcohol having from 8 to 12 carbon atoms.

The compounds of the invention may be used for killing meristematic buds on ornamental and agricultural herbaceous, semiwoody, and woody plants such as chrysanthemum, cotton, azalea, apple, and tobacco. Meristematic buds include both terminal and axillary buds. The selective killing of axillary buds is an application for which the chemicals of the invention are particularly useful.

Examples of diesters suitable for preparation of compositions of this invention include:
  ethylene glycol diheptanoate
  triethylene glycol diheptanoate
  1,4-butanediol diundecylenate
  1,6-hexanediol diundecylenate
  1,6-hexanediol di($C_{12} - C_{16}$) alkanoate wherein the residual carboxyl groups are a mixture of lauric, myristic, and palmitic acid residues obtained from distilled coconut oils
  triethylene glycol diester wherein the carboxylic acid residue is a mixture of $C_8$ and $C_{10}$ groups The compositions of the present invention may be applied to plants, which term includes various plant parts such as flowers, fruits, vegetables, roots, and foliage in various manners. In one embodiment of the invention, the composition is applied as an aqueous dispersion or emulsion. For example, the composition may be applied in a coarse water spray directed to the stem of the plant, and such spray application is found to give effective control. The chemicals may also be dissolved in organic solvents such as acetone, benzene, or kerosene (assuming these chemicals will not harm the plant), and the solutions of the chemicals emulsified in water with the aid of surface-active agents. The chemicals of the invention may be admixed with powdered solid carriers, such as mineral silicates, together with a surface-active agent so that a wettable powder may be obtained which may be applied directly to plants, or which may be shaken up with water for application to the plants in that form.

As employed, the surface active agents or emulsifiers may be anionic, cationic, or nonionic, and are exemplified by conventional soaps, such as the water-soluble salts of long chain carboxylic acids, the amine soaps such as the amine salts of long chain carboxylic acids, the sulfonated animal, vegetable, and mineral oils, quaternary ammonium salts of high molecular weight acids, rosin soaps such as salts of abietic acid, sulfuric acid salts of high molecular weight basic organic compounds, algin soaps, ethylene oxide condensed with fatty acids and/or sorbitol esters, alkyl phenols, and mercaptans, and other simple as well as polymeric compositions having both hydrophilic and hydrophobic functions so as to enable the mixing of otherwise immiscible ingredients. Generally, the surface active agents will be only a minor portion of the formulation as used, for example, less than 10% and frequently as low as 0.5%. In general, concentrations of from 0.5 to 5% are found to be optimum. Typical useful emulsifiers by trade name and chemical description are as follows: Antarox A-401, alkylarylpolyoxyethyleneglycol ether; Nonisol 210, polyethyleneglycololeate; Triton X45, alkylarylpolyoxyethylene alkylaryl alcohols; ethers of polyoxyethylene glycol; sorbitan fatty acid esters, e.g., Tween 20, Tween 60; and fatty acid esters of polyethylene glycol, e.g., Ethofat 60/25 and Kessco PEG-600 monostearate.

Alcohols useful in the preparation of the compositions of this invention include hexanol, octanol, nonanol, decanol, undecanol, dodecanol, and mixtures thereof typified by commercially available products such as "Alfo 810" sold by Continental Oil Company, which is a mixture of octanols and decanols. Other useful alcohols are exemplified by mixtures ($C_7 - C_9 - C_{11}$) of alcohols sold by the designation of Oxo alcohols by the Monsanto Chemical Company. These alcohol mixtures contain, for example, about 30% branched chain compounds which are generally 2-methyl substituted alcohols. Suitable $C_7 - C_9 - C_{11}$ mixtures contain, for example, about 40% $C_7$, 40% $C_9$, and 20% $C_{11}$. The alcohols employed include both straight and branched-chain alcohols and can be derived from synthetic or natural sources, e.g., paraffins and/or fatty acids or their esters. As employed in the invention, the alcohols contain from 6 to 12 carbon atoms and preferably contain from 8 to 11 carbon atoms. It is understood that small amounts of impurities such as fatty acids and hydrocarbons may be present due to the method of preparation of the alcohols employed, but this is generally undesirable and should be minimized where possible. Also, alcohols having less than 6 and more than 12 carbon atoms can be used with some benefit and indeed are frequently present as impurities. Suitable fatty acid sources of alcohols include caproic acid, caprylic acid, capric acid, and lauric acid with the corresponding alcohol being produced by reduction of the acid or its ester by means well known in the art.

The diesters used as plant growth regulators are generally prepared by conventional methods such as reaction of one mole of a glycol, e.g., ethylene glycol, with two moles of the carboxylic acid. A light excess of the acid is employed to force the reaction equilibrium towards completion. Reaction frequently is carried out over periods of several hours or longer and at temperatures of from approximately 180° to 240° C. Following completion of the reaction, the reaction mixture is vacuum distilled to remove residual acid and also some small amount of unreacted glycol. Yields of diester of 90% and better are frequently obtained.

In carrying out the above diester synthesis, glycols which can be employed include ethylene glycol, diethylene glycol, triethylene glycol, 1,2-propane diglycol, trimethylene glycol, 1,4-butanediol and 1,6-hexanediol. Carboxylic acids which can be employed include heptanoic, octanoic, nonanoic, undecanoic, and dodecanoic. The acids are frequently derived from natural sources such as animal fats and coconut oils, and can be normal or branched-chain, as where acids derived from synthetic sources are employed.

On a weight basis, the concentration of diester in the useful formulations (before dilution with water or other materials prior to application) may vary widely, e.g., from 10 to 75%. Following dilution to form an aqueous formulation, the concentration of diester is from 0.1 to 10%, which is effective for the control of undesirable secondary growth, and best results have been obtained using concentrations of from about 0.5 to 2%.

The diesters employed in the invention may be prepared by several different methods.

The following examples illustrate the application of compositions of the invention to tobacco plants.

EXAMPLE I

This example illustrates treatment of flue-cured tobacco.

As applied, the compositions were in the form of aqueous emulsions. These were applied to tobacco plants in the early button to early flowering stages, by spraying tops and stems with a 3-nozzle sprayer, and allowing the emulsion to drain down along the stem of the plant where meristematic and differentiating tissues are destroyed through contact. The emulsions were applied at a rate of approximately 30 to 50 gallons per acre. In forming the emulsions, from 12 to 18 pints of diester formulation were employed per 50 gallons of water. Following the first application, a second application was made after about 10 days using the same procedure as in the first application. After 7 to 14 days following the last application, the effectiveness of the spray treatment was determined by weighing the number of suckers remaining after treatment and comparing with the weight of suckers present in a control plot wherein the tobacco was untreated. The degree of sucker control was then expressed as the percentage of remaining suckers from the treated plot as compared with suckers in the control plot, e.g., if the total weight of suckers from the treated plot was 25% less than the total sucker weight from the control plot, the degree of sucker control was 25%.

As a comparison, several runs were carried out using as sucker control agent a fatty alcohol emulsified with an ethylene oxide condensate of a sorbitan fatty acid ester. The particular composition contained approximately 80% by weight of a mixture of $C_8$ and $C_{10}$ alcohols emulsified with about 20% by weight of the ethylene oxide - sorbitan fatty acid ester condensate (sold commercially as Tween 80). To form emulsions, the composition was admixed with water at a rate of 20 to 22 pints per 50 gallons of water. The aqueous emulsions were applied at rates equivalent to the emulsions formed from compositions of the invention. The composition used as a comparison is sold commercially as "Off-Shoot T" a product of the Proctor and Gamble Company.

In several instances, maleic hydrazide (MH) was applied in place of the second application of the compounds of the invention. Application was by conventional means and the concentration employed was 12 pints/50 gallons of water.

As used in the Table, the AB designations represent the following compositions of the invention:

1. AB-1 is a triethylene glycol diester wherein the carboxylic acid residue is a 50/50 mixture of normal $C_8$ and $C_{10}$ groups. On a weight basis, the composition consists of 70% undecanol, 20% diester, and 10% of an emulsifier which is the condensation product of approximately equal molar amounts (1/1) of sorbitol and acid with 20 moles of ethylene oxide.
2. AB-2 resembles AB-1 except that the relative proportions are 10% diester, 10% emulsifier, and 80% undecanol.
3. AB-3 consists of 70% undecanol, 10% emulsifier (as in AB-1) and 20% ethylene glycol diheptanoate.
4. AB-4 is 70% undecanol, 10% emulsifier (as in AB-1), and 20% 1,4-butanediol diundecylenate.

TABLE I

| Run | Treatment | A Pts./50 gal. Water | | B Live Oak, Florida % Control | | C Kinston, N.C. % Control | | D Oxford, N.C. % Control | |
|---|---|---|---|---|---|---|---|---|---|
| | | 1st appln. | 2nd appln. | No. | Wt. | No. | Wt. | No. | Wt. |
| 1 | Fatty alcohol composition | 20 | 22 | 35.1 | 21.1 | 72.7 | 76.0 | 70.3 | 53.0 |
| 2 | Fatty alcohol composition then MH | 20 | 12 | −12.6 | 75.5 | 90.3 | 99.3 | 85.1 | 95.8 |
| 3 | AB-1 | 14 | 16 | | | 56.6 | 62.3 | 70.3 | 50.3 |
| 4 | AB-1 | 18 | 20 | | | 64.9 | 77.3 | 70.3 | 67.5 |
| 5 | AB-1 then MH | 14 | 12 | 28.5 | 87.1 | | | | |
| 6 | AB-1 then MH | 18 | 12 | | | 71.4 | 95.5 | 84.6 | 97.0 |
| 7 | AB-2 | 12 | 13 | 50.2 | 20.6 | 57.8 | 67.9 | 66.8 | 46.6 |
| 8 | AB-2 | 14 | 14 | | | 52.3 | 76.0 | 68.5 | 38.9 |
| 9 | AB-2 then MH | 14 | 12 | 27.6 | 89.0 | 66.3 | 97.9 | 76.3 | 96.1 |
| 10 | AB-3 | 12 | 12 | | | 62.0 | 72.4 | 74.3 | 43.4 |
| 11 | AB-3 | 14 | 14 | | | 63.1 | 66.3 | 79.9 | 66.7 |
| 12 | AB-3 | 16 | 16 | | | 64.7 | 75.3 | 76.8 | 67.1 |
| 13 | AB-3 then MH | 12 | 12 | 22.2 | 82.1 | | | | |
| 14 | AB-3 then MH | 14 | 12 | | | 69.9 | 97.9 | 77.0 | 95.5 |
| 15 | AB-4 | 12 | 13 | 39.6 | 15.3 | 56.3 | 61.5 | 61.8 | 41.8 |
| 16 | AB-4 | 14 | 16 | | | 66.5 | 81.0 | 62.4 | 50.3 |
| 17 | AB-4 then MH | 14 | 12 | 38.7 | 86.5 | 71.7 | 97.9 | 79.3 | 94.5 |

In Table I, the designations "Florida", "Kinston", and "Oxford" in columns B, C, and D, respectively, refer to the areas in which the tests were conducted. Kinston and Oxford both refer to farms in the eastern portion of North Carolina.

The designation "No. " is a measure of the number of suckers in a treated plot in comparison with a control plot. The figure is given in percentage terms. For example, a figure of 76.0 indicates that a treated plot had only 24% of the number of suckers found in the control (untreated) plot. The number figure does not consider the size of the suckers and therefore the figure for weight is more meaningful. The figure of minus 12.6 in the number column in B of run 2 indicates that more suckers were found in the treated plot than in the untreated control plot and is perhaps aberrational.

From the various runs, it is apparent that the compositions of the invention are generally equivalent to, or superior to, the fatty alcohol composition employed presently. In instances where the compositions of the invention were not as successful in sucker control, the deficiency is attributed to the fact that lesser amounts were used in comparison with the amounts of fatty alcohol composition employed. For example, in runs 10, 11, and 12, the amount of chemical employed is increased from 12 to 14 to 16 pints per gallons of water.

In column D, it can be seen by reference to the weight column that increased concentration levels increased the sucker control activity to a point where it surpassed the control level achieved by the fatty alcohol composition in run 1. In column C, the increased concentration levels resulted in control generally equivalent to that achieved by the fatty alcohol composition in run 1. It should be noted that the above control levels were achieved even though the concentration level for the diester compositions of the invention was only 80% or less of the concentration in the fatty alcohol composition.

Also of interest is the control achieved when the initial treatment with the diester compositions was followed by treatment with maleic hydrazide. This is illustrated in runs 5, 6, 9, 13, 14, and 17. Effective sucker control is obtained in a very efficient manner when the hydrazide is employed in conjunction with the compositions of the invention.

EXAMPLE II

Following the general procedure of Example I, runs 18 through 31 were conducted. In these runs, it will be noted, however, that only one application of the composition was made. Also, the tobacco treated was burley rather than flue-cured as in Example I. The results are set forth in Table II.

TABLE II

| Run | Treatment | A<br>Pts. Chem.<br>50 gal.<br>Water | B<br>Waynesville, N.C.<br>% Sucker Control | | | | C<br>Laurel Springs, N.C.<br>% Sucker Control | | | | D<br>% Sucker<br>Control | |
|---|---|---|---|---|---|---|---|---|---|---|---|---|
| | | | Test I | | Test II | | Test I | | Test II | | | |
| | | | No. | Wt. | No. | Wt. | No. | Wt. | No. | Wt. | No. | Wt. |
| 18 | Fatty alcohol composition* | 20 | 80.3 | 77.6 | 91.4 | 93.7 | 82.9 | 76.0 | 94.7 | 90.0 | 99.1 | 100 |
| 19 | AB-1 | 14 | 53.8 | 63.3 | 94.5 | 90.5 | 92.9 | 88.0 | 89.4 | 83.3 | | |
| 20 | AB-1 | 16 | 92.4 | 89.8 | 81.0 | 92.1 | 95.0 | 92.0 | 93.9 | 93.3 | 58.7 | 83.8 |
| 21 | AB-1 | 18 | 89.4 | 90.8 | 95.1 | 96.8 | 95.0 | 92.0 | | | | |
| 22 | AB-2 | 12 | 66.7 | 81.6 | | | 93.6 | 96.0 | | | | |
| 23 | AB-2 | 14 | 81.1 | 93.9 | | | 87.9 | 88.0 | | | | |
| 24 | AB-2 | 16 | 87.9 | 84.7 | 100.0 | 100.0 | 85.7 | 88.0 | | | | |
| 25 | AB-2 | 18 | 97.7 | 99.0 | 98.2 | 98.4 | | | | | | |
| 26 | AB-3 | 12 | 60.6 | 66.3 | 82.2 | 85.7 | 90.0 | 88.0 | | | | |
| 27 | AB-3 | 14 | 60.6 | 69.4 | 96.3 | 93.7 | 78.6 | 84.0 | 88.2 | 83.3 | 64.8 | 85.0 |
| 28 | AB-3 | 16 | 81.8 | 80.6 | 87.7 | 92.1 | 90.0 | 88.0 | 81.4 | 66.7 | | |
| 29 | AB-4 | 12 | 59.1 | 65.3 | 73.6 | 84.1 | 72.1 | 72.07 | | | | |
| 30 | AB-4 | 14 | 68.9 | 70.4 | 84.0 | 90.5 | 92.9 | 92.0 | 77.6 | 66.7 | 52.2 | 86.3 |
| 31 | AB-4 | 16 | 62.9 | 46.9 | 85.3 | 92.1 | 92.1 | 88.0 | 82.1 | 76.7 | | |

*The fatty alcohol composition was the same as in runs 1 and 2 of Example I

What is claimed is:

1. A composition for controlling the growth of suckers in tobacco plants, consisting essentially of:
   a. from about 10% to about 75% by weight of an aliphatic monocarboxylic acid diester of an aliphatic glycol selected from the group consisting of an alkylene glycol containing from 2 to 6 carbon atoms, diethylene glycol, and triethylene glycol, said acid having 7 to 15 carbon atoms;
   b. from about 0.5% to about 10% by weight of a surfactant; and
   c. from about 70% to about 80% of the total weight of the composition of an aliphatic alcohol having 8 to 12 carbon atoms.

2. A composition as in claim 1 wherein the glycol is ethylene glycol.

3. A composition as in claim 1 wherein the glycol is 1,4-butanediol.

4. A composition as in claim 1 wherein the glycol is triethylene glycol.

5. A composition as in claim 1 wherein the carboxylic acid diester is ethylene glycol diheptanoate.

6. A composition as in claim 1 having as a reactive component a diester of triethylene glycol wherein the carboxylic acid residue is a mixture of $C_8$ and $C_{10}$ groups.

7. A composition as in claim 1 wherein the diester is 1,4-butanediol diundecylenate.

8. A composition as in claim 1 wherein the surface active agent is ethylene oxide condensate of sorbitan fatty acid ester.

9. A composition as in claim 1 wherein the alcohol is undecanol.

10. A composition as in claim 1 wherein the alcohol is a mixture of $C_8$ and $C_{10}$ alcohols.

11. A method for controlling sucker growth on tobacco plants which comprises applying to said plants an aqueous dispersion containing an effective amount for sucker control, of a concentrate consisting essentially of:
   a. from about 10% to about 75% by weight of an aliphatic monocarboxylic acid diester of an aliphatic glycol selected from the group consisting of an alkylene glycol containing from 2 to 6 carbon atoms, diethylene glycol, and triethylene glycol, said acid having 7 to 15 carbon atoms;
   b. from about 0.5% to about 10% by weight of a surfactant; and
   c. from about 70% to about 80% of the total weight of the composition of an aliphatic alcohol having 8 to 12 carbon atoms.

12. A method as in claim 11 wherein the glycol is ethylene glycol.

13. A method as in claim 11 wherein the glycol is 1,4-butanediol.

14. A method as in claim 11 wherein the glycol is triethylene glycol.

15. A method as in claim 11 wherein the carboxylic acid diester is ethylene glycol diheptanoate.

16. A method as in claim 11 having as a reactive component a diester of triethylene glycol wherein the carboxylic acid residue is a mixture of $C_8$ and $C_{10}$ groups.

17. A method as in claim 11 wherein the diester is 1,4-butanediol diundecylenate.

18. A method as in claim 11 wherein the surface active agent is an ethylene oxide condensate of sorbitan fatty acid ester.

19. A method as in claim 11 wherein the alcohol is undecanol.

20. A method as in claim 11 wherein the alcohol is a mixture of $C_8$ and $C_{10}$ alcohols.

* * * * *